July 2, 1968  J. T. HERBERT ETAL  3,390,899
FLEXIBLE JOINT MEANS
Filed March 15, 1965  3 Sheets-Sheet 2
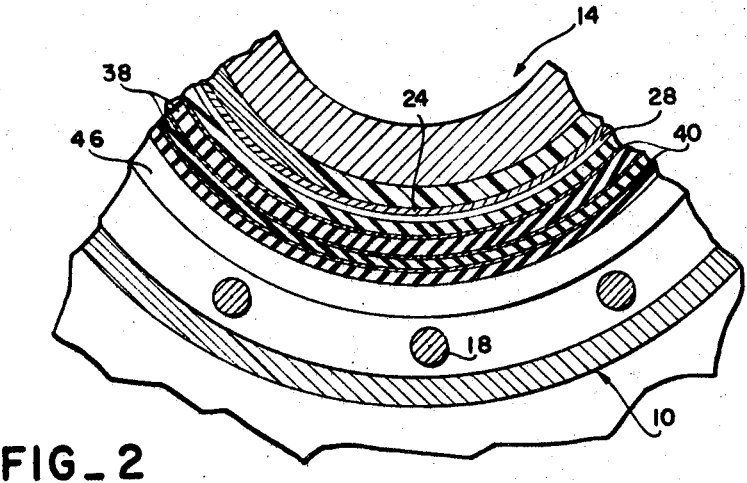
FIG_2
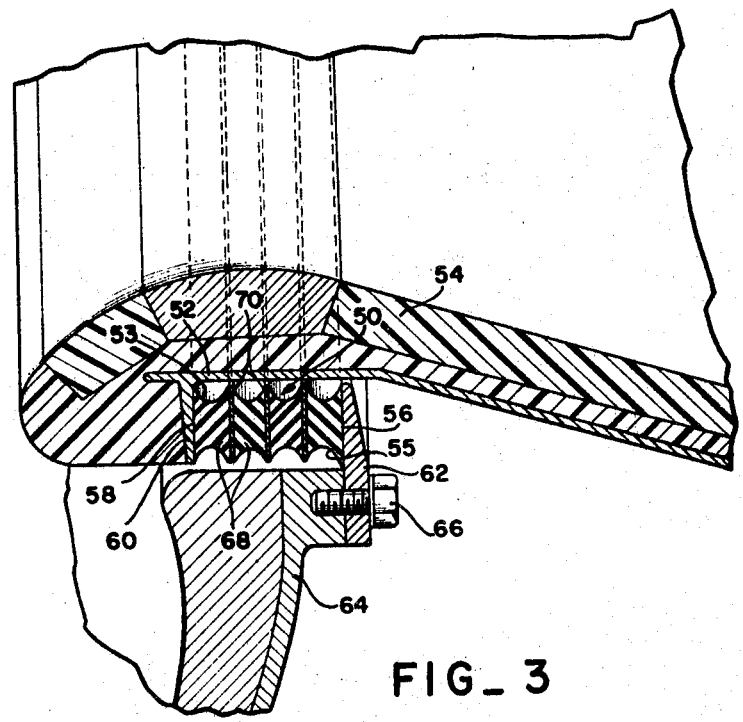
FIG_3
INVENTORS
JOHN T. HERBERT
FRANK J. KOVITCH, JR.
MAX MCCORKLE
By George C. Sullivan
Agent

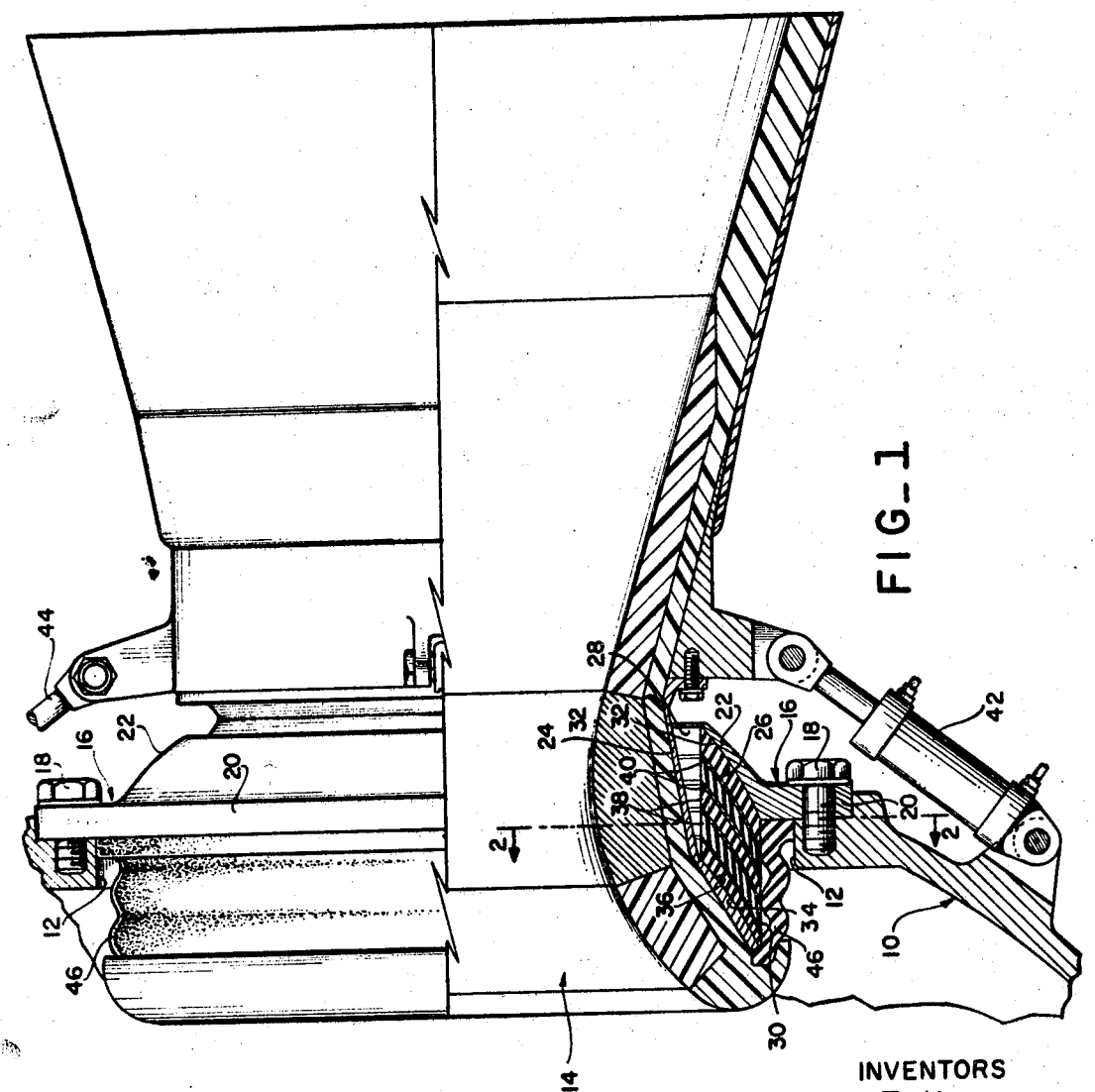

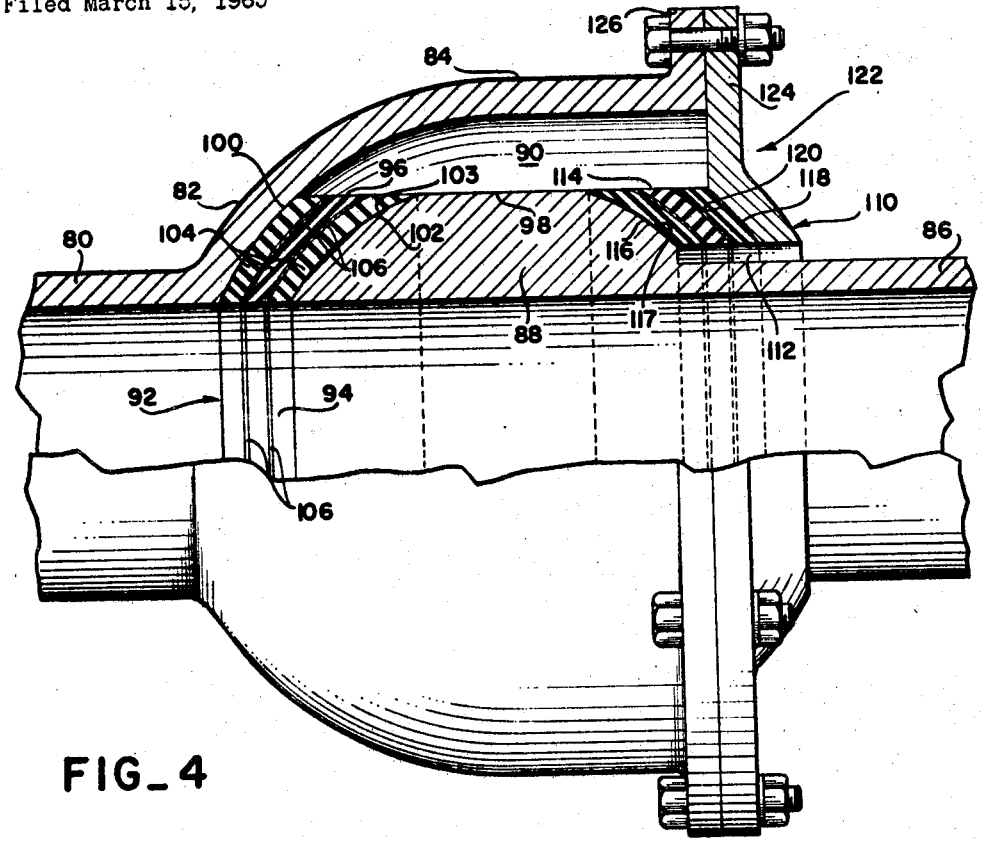
FIG_4
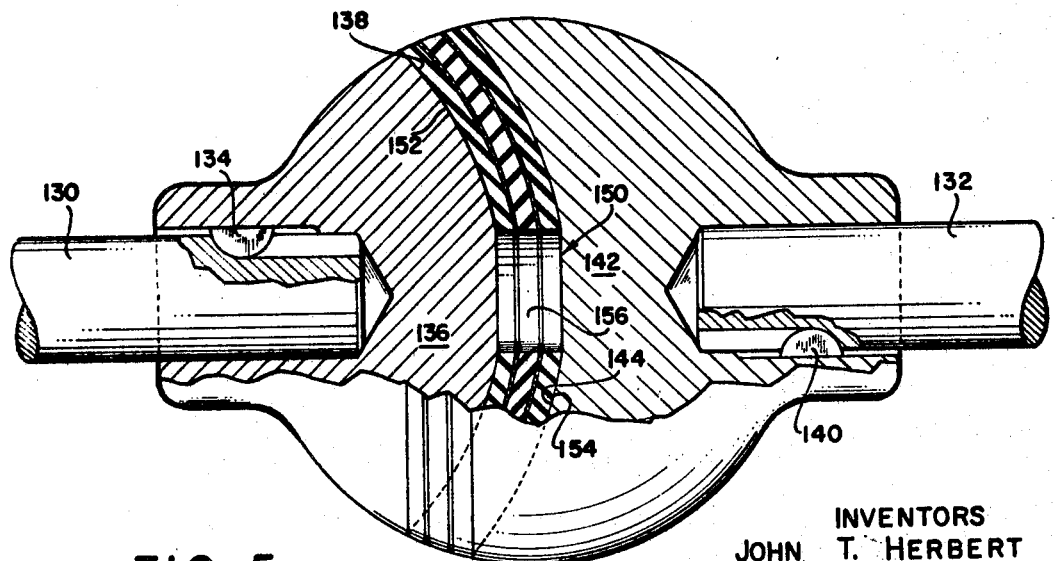
FIG_5
INVENTORS
JOHN T. HERBERT
FRANK J. KOVITCH, JR.
MAX McCORKE
By George C. Sullivan
Agent United States Patent Office 3,390,899
Patented July 2, 1968

3,390,899
FLEXIBLE JOINT MEANS
John T. Herbert, Redlands, Frank J. Kovitch, Jr., Riverside, and Max McCorkle, Redlands, Calif., assignors to Lockheed Aircraft Corporation, Burbank, Calif.
Filed Mar. 15, 1965, Ser. No. 439,725
5 Claims. (Cl. 285—45)

ABSTRACT OF THE DISCLOSURE

An omnidirectionally flexible joint for rocket nozzles, conduits and the like, wherein an annular ring of alternating layers of resilient material and reinforcing material is bonded between an externally projecting surface on a submerged section of the joint and an internally projecting surface on the other section.

---

This invention relates to a flexible joint means for coupling shafts, conduits, and the like, and more particularly to an annular joint means comprising alternate layers of a resilient material and a rigid reinforcing material.

The present joint is particularly useful for coupling structural members which are required to be moved relative to each other in an omnidirectional manner and which may also be required to withstand fluid pressure or structural loads, such as are frequently encountered in pipe lines and ducting. The resilient material in the present joint provides for flexibility whereas the rigid reinforcing material provides the means for withstanding pressure and structural loads.

Other features and advantages of the present invention will become more apparent from the following detailed description of typical forms and applications of the invention taken in conjunction with the accompanying drawings in which:

FIGURE 1 is an elevational view, partly in section, of a portion of a rocket motor wherein the present joint means is used to connect the nozzle to the motor case to provide a movable nozzle for thrust vector control;

FIGURE 2 is an enlarged fragmentary, sectional view of the present joint means taken along the line 2—2 of FIGURE 1;

FIGURE 3 is a fragmentary, elevational view in section of a rocket motor incorporating another embodiment of the present joint;

FIGURE 4 is an elevational view, partly in section, of a pipe line incorporating another embodiment of the present invention; and FIGURE 5 is an elevational view, partly in section, of a drive shaft incorporating still another embodiment of the present invention.

FIGURE 1 shows a portion of a typical rocket motor having a motor casing 10 with a discharge opening 12 and a convergent-divergent expansion nozzle 14 partially submerged in the opening 12. An adapter ring 16 is placed around the opening 12 and attached to the case 10 with suitable fastening means 18 through a mounting base 20. Ring 16 also has an arcuate portion 22, generally in the shape of a hollow spherical segment, which protrudes in the direction of the constricted portion 24 of the nozzle.

The present joint means comprises an annular member 26 disposed around the constricted portion 24 of the nozzle and adapted to join the nozzle to the motor case. Thus, member 26 has two generally cylindrical surfaces 28 and 30 comprising respectively the interior and exterior free surfaces of the member and two generally spherical surfaces 32 and 34. Surface 32 is attached by bonding or other means to the arcuate portion 22 of ring 16 and surface 34 is likewise attached to a mating spherical surface 36 disposed in the convergent portion of the nozzle 14. Member 26 is further comprised of alternate layers of a resilient material 38, such as rubber, and a relatively rigid reinforcing material 40, such as steel, said layers being bonded or vulcanized into an integral assembly. As shown, the layers of rigid material are considerably thinner than the layers of resilient material; however, the former should be thick enough to prevent buckling. An annular boot 46 of high temperature resilient material, such as an elastomer, is attached between the adapter ring and nozzle thereby encircling the member 26 for protection against exposure to the hot exhaust gases.

In the operation of the rocket motor, the present joint means is well adapted to take the axial compressive loads due to motor chamber pressure and the shear loads due to movement of the nozzle for thrust vector control. As is well known, the nozzle may be moved by means such as actuators 42, 44 attached to the casing and nozzle and thereby change the direction of the thrust vector and in turn the direction of the vehicle propelled by the rocket motor. By movement of the appropriate actuator, the nozzle is caused to pivot about a point approximately at the intersection of the nozzle center line and the radius of gyration of the center layer in the annular member 26. When deflected, the present joint has a self-centering effect on the nozzle in that the resilient material in the joint functions as a large spring system and exerts a force tending to move the nozzle to the normal or non-deflected position.

Another embodiment of the present invention, as used in rocket motors, is shown in FIGURE 3. The joint means shown there is comprised of an annular member 50, generally in the form of a washer, surrounding the constricted portion 52 of the nozzle 54. Member 50 has generally cylindrical, free surfaces 53, 55 and planar fore and aft surfaces 56, 58 which are bonded respectively to a flange 60 attached to a shoulder in the forward end of the nozzle and to an adapter ring 62 attached to the motor case 64 by suitable fastening means 66. Member 50 also is comprised of alternate layers of a resilient material 68, such as rubber, and a relatively rigid reinforcing material 70, such as steel. The free surfaces of the resilient material may be undercut as shown for stress relief during flexing of the joint. The other details of this embodiment are substantially the same as the previous embodiment and consequently are not further described.

As previously mentioned, the use of the present joint means in rocket motors provides for omnidirectional movement of the nozzle and is well adapted to withstand the rocket chamber pressures and to take the flexural loads due to the movement of the nozzle. The present joint also has other advantages not found in presently known rocket motors with movable nozzles. For example, it eliminates the excessive weight of a gimbal ring which is used in some motors for supporting the nozzle. Other motors use a split nozzle for omnidirectional movement at the split. These split nozzles pose difficult sealing problems, which are completely eliminated by the present joint means.

FIGURE 4 shows a still further embodiment of the present invention for coupling pipe lines where omnidirectional flexibility and withstanding of line pressures and loads are desired. Pipe 80 has an enlarged opening with a flared portion 82 and a constant diameter portion 84. Connecting pipe 86 has an enlarged bulbous end 88 adapted to fit within the enlarged end of pipe 80 with a clearance space 90 provided between the ends. Joint 92 in accordance with the present invention is provided at the flared portion 82 of pipe 80. Joint 92 is generally in the shape of a hollow spherical segment with a central cylindrical surface 94 and an exterior cylindrical surface 96. Surface 94 defines an opening having approximately the same inside diameter as pipe 80 and surface 96 is approximately flush with the cylindrical portion 98 of the end 88. Joint 92 further has spherical surfaces 100, 102 bonded respectively to the flared portion 82 of pipe 80 and to a spherical surface 103 on end 88 of pipe 86. Joint 92 is comprised of alternate layers of resilient material 104 and a relatively rigid reinforcing material 106 which respectively provide for flexibility and strength in the joint.

An auxiliary joint 110 in accordance with the present invention is provided at the end of the cylindrical portion 84 for the purpose of resisting loads tending to pull joint 92 apart. Joint 110 has the same general construction as joint 92. Thus, joint 110 has a central cylindrical surface 112 and an exterior cylindrical surface 114. Surface 112 has a diameter larger than the outside diameter of pipe 86, thus providing for a clearance space between the pipe and the joint, and surface 114 is approximately flush with the cylindrical surface 98. Joint 110 further has a spherical surface 116 which is bonded to a complementary spherical surface 117 on the end 88 and a spherical surface 118 which is bonded to a complementary spherical surface 120 of a collar 122 circumscribing pipe 86. The collar also has a ring portion 124 adapted to be connected to a mating flange 126 on the ends of pipe 80, said ring portion and flange clamping the two pipes together.

FIGURE 5 shows another embodiment of the present joint means which is used to join two drive shafts 130, 132. Drive shaft 130 is attached by appropriate key means 134 to an end member 136 which has a spherical surface 138. Drive shaft 132 is also attached by appropriate key means 140 to an end member 142 which has a spherical surface 144 which is complementary to surface 138, said surfaces approximating a ball and socket relationship. Members 136 and 142 are joined by joint 150 in accordance with the present invention. Joint 150 has spherical surfaces 152, 154 complementary to surfaces 138 and 144 and a central opening 156 having approximately the same diameter as the drive shafts 130, 132. Joint 150 provides for omnidirectional movement of shafts 130, 132.

The resilient material in the present joint means is preferably an elastomer, including the various kinds of synthetic rubber. The reinforcing material may be any relatively rigid matter with a higher modulus of elasticity than the resilient material, such as reinforced plastic, titanium, aluminum, steel and other metals.

Although particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

We claim:

1. A joint means for flexibly coupling a submerged, convergent-divergent nozzle to a rocket motor casing with a discharge opening, said joint means comprising: an exterior, ball surface on the submerged portion of the nozzle; an adapter ring mounted on the casing around the discharge opening, said ring having a socket surface opposite to and axially aligned with said ball surface; an annular member circumscribing said nozzle, said annular member having dual, generally spherical surfaces adapted to be bonded to said ball and socket surfaces and inner and outer, generally cylindrical, free surfaces, the inner surface of said annular member being radially spaced along its entire length from the nozzle portion adjacent said ball surface; and said member being comprised of layers of a rubbery material and relatively thinner layers of a metallic material interposed between the layers of rubbery material.

2. A joint means in accordance with claim 1, wherein the free surfaces of the rubbery material are undercut to provide stress relief upon flexing of the joint.

3. A joint means in accordance with claim 1, including elastomeric means to protect the cylindrical surface of the annular member which is exposed to the hot discharge gases.

4. A joint means for flexibly coupling conduit members for omnidirectional movement of said members, said means comprising: a generally bell-shaped end on the first conduit member, said end having a portion with a spherical, socket surface and a portion with a constant diameter; an enlarged, bulbous end on the second conduit member, said bulbous end sliding within the end of the first conduit member and having a ball surface complementary to the socket surface on the end of the first conduit member; an annular member having dual, generally spherical surfaces adapted to be attached to said ball and socket surfaces; a second ball surface on the bulbous end; a collar circumscribing said second conduit member, said collar having a second spherical socket surface complementary to the second ball surface; a second annular member having dual, generally spherical surfaces adapted to be attached to said second ball and socket surfaces, at least the second annular member having inner and outer generally free cylindrical surfaces, the inner surface being radially spaced from the second conduit member; said first and second annular members having alternate layers of a resilient material and a relatively rigid reinforcing material; and means for clamping said collar to the end of the first conduit means.

5. A joint means for flexibly coupling a submerged substantially cylindrical first member having an opening therethrough to a second member having an opening therein, said joint means comprising: an exterior, ball surface on the submerged portion of said first member; an adapter ring mounted on the second member around the opening, said adapter ring having a socket surface opposite to and axially aligned with said ball surface; an annular member circumscribing said first member, said annular member having dual, generally spherical surfaces adapted to be bonded to said ball and socket surfaces and inner and outer generally cylindrical, free surfaces, said inner free surface being spaced radially from said first member along the entire free surface; and said member being comprised of layers of rubbery material and relatively thinner layers of a metallic material interposed between the layers of rubbery material.

References Cited

UNITED STATES PATENTS

| | | | |
|---|---|---|---|
| 1,229,417 | 6/1917 | Daft | 287—85 |
| 3,032,982 | 5/1962 | Gaulbatz | 239—588 X |
| 3,110,510 | 11/1963 | Berner | 287—85 |
| 3,168,334 | 2/1965 | Johnson | 285—223 X |
| 3,190,680 | 6/1965 | Maly | 285—231 |

FOREIGN PATENTS

| | | |
|---|---|---|
| 928,384 | 5/1955 | Germany. |
| 542,208 | 12/1941 | Great Britain. |

CARL W. TOMLIN, *Primary Examiner.*

T. F. CALLAGHAN, *Assistant Examiner.*